(12) United States Patent
Olsen et al.

(10) Patent No.: US 8,051,964 B2
(45) Date of Patent: Nov. 8, 2011

(54) TORQUE CONVERTER WITH COOLING FLUID FLOW ARRANGEMENT AND ARRANGEMENT FOR TORQUE TRANSFER TO A DAMPER

(75) Inventors: Steven Olsen, Wooster, OH (US); Jonathan G. Jameson, Canton, OH (US); Kevin Parks, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 550 days.

(21) Appl. No.: 12/150,837

(22) Filed: May 1, 2008

(65) Prior Publication Data

US 2008/0277222 A1 Nov. 13, 2008

Related U.S. Application Data

(60) Provisional application No. 60/928,437, filed on May 9, 2007, provisional application No. 60/958,346, filed on Jul. 5, 2007.

(51) Int. Cl.
*F16H 45/02* (2006.01)

(52) U.S. Cl. .................. 192/3.3; 192/70.17; 192/212

(58) Field of Classification Search .............. 192/3.3
See application file for complete search history.

(56) References Cited

U.S. PATENT DOCUMENTS

| 5,669,475 | A * | 9/1997 | Matsuoka | 192/3.29 |
|---|---|---|---|---|
| 6,247,568 | B1 * | 6/2001 | Takashima et al. | 192/70.12 |
| 6,688,441 | B1 * | 2/2004 | Arhab et al. | 192/3.29 |
| 7,036,643 | B2 * | 5/2006 | Back et al. | 192/3.3 |
| 2004/0216971 | A1 * | 11/2004 | Johann et al. | 192/3.26 |
| 2005/0126874 | A1 * | 6/2005 | Back et al. | 192/3.3 |
| 2006/0207851 | A1 * | 9/2006 | Heuler et al. | 192/3.3 |
| 2008/0000745 | A1 |  1/2008 | Swank et al. | |

FOREIGN PATENT DOCUMENTS

JP   57134018   * 8/1982

* cited by examiner

*Primary Examiner* — Richard M. Lorence
*Assistant Examiner* — Jacob S. Scott
(74) *Attorney, Agent, or Firm* — Simpson & Simpson, PLLC

(57) ABSTRACT

A torque converter including: a pump shell; a cover; and a backing plate for a torque converter clutch fixed by contact with the cover and the pump shell. In some aspects, the backing plate is fixed by axial pressure exerted by the cover and the pump against the backing plate. A torque converter including: a plurality of components axially disposed between a pump shell and a cover; and a pump hub fixedly secured to the pump shell. The position of the pump hub with respect to the pump shell is selected to establish respective axial distances between components in the plurality of components. A torque converter including: turbine shell; and a backing plate for a torque converter clutch, the backing plate rotationally connected to the turbine shell and forming a portion of a boundary between first and second pressure chambers.

13 Claims, 13 Drawing Sheets

TORQUE CONVERTER WITH COOLING FLUID FLOW ARRANGEMENT AND ARRANGEMENT FOR TORQUE TRANSFER TO A DAMPER

CROSS-REFERENCE TO RELATED APPLICATIONS

This application claims the benefit under 35 U.S.C. §119 (e) of U.S. Provisional Application No. 60/958,346 filed on Jul. 5, 2007 and U.S. Provisional Application No. 60/928,437 filed on May 9, 2007, which applications are incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a torque converter with a torque converter clutch providing torque to a turbine hub during lock-up mode while minimizing frictional losses during torque converter mode and providing improved cooling flow.

BACKGROUND OF THE INVENTION

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

In lock-up mode for the torque converter, there is little or no torque applied to turbine hub 19. At the same time, cover plates 16 are receiving engine torque through the damper. Thus, there is intermittent contact between cover plate 16 and the turbine hub at the at the spline connection between the plate and the hub, resulting in undesirable vibration and noise. Alternately stated, the cover plate 'bangs' against the turbine hub at the spline connection due to fluctuations in the engine torque, causing the vibration and noise noted above. Commonly-owned U.S. Provisional Patent Application No. 60/816,932, filed Jun. 28, 2006 discloses a means for preventing the vibration and noise noted above during operation of a torque converter during torque converter mode. However, it would be desirable to further reduce drag in the torque converter clutch during the operation in torque converter mode.

Therefore, there is a long-felt to provide a torque converter with a means of preventing rattle and reducing drag in a torque converter clutch during operation in torque converter mode.

BRIEF SUMMARY OF THE INVENTION

The present invention broadly comprises a torque converter including: a pump shell; a cover; and a backing plate for a torque converter clutch fixed by contact with the cover and the pump shell. In some aspects, the backing plate is fixed by axial pressure exerted by the cover and the pump against the backing plate. In some aspects, the pump shell and the cover include respective inner circumferential surfaces and the backing plate includes an outer circumferential surface in contact with at least one of the respective inner circumferential surfaces. In some aspects, the outer circumferential surface is serrated and frictionally engaged with the at least one of the respective inner circumferential surfaces. In some aspects, the cover includes an inner circumferential surface and the backing plate includes a serrated outer circumferential surface frictionally engaged with the inner circumferential surface. In some aspects, the pump shell includes a radial surfaces and the backing plate includes a radial surface in contact with the radial surface for the pump shell. In some aspects, the backing plate is arranged to react an axial force from the clutch when the clutch is closed.

The present invention also broadly comprises a method for assembling a torque converter, including the steps of: disposing a backing plate for a torque converter clutch between a cover and a pump shell; axially urging one of the cover and pump shell against the backing plate to fix the backing plate between the cover and the pump shell; and fixedly securing the cover to the pump shell. In some aspects, the pump shell and the cover include respective inner circumferential surfaces and the backing plate includes an outer circumferential surface and disposing the backing plate includes placing the outer circumferential surface in contact with at least one of the respective inner circumferential surfaces. In some aspects, axially urging one of the cover and pump shell against the backing plate to fix the backing plate includes frictionally engaging the backing plate with the pump shell and the cover. In some aspects, the pump shell includes a respective radial surface and the backing plate includes a radial surface and disposing the backing plate includes placing the radial surface of the backing plate in contact with the radial surface for the pump shell.

The present invention further broadly comprises a method for assembling a torque converter, including the steps of: measuring the height of a clutch pack; disposing a backing plate for a torque converter clutch between a cover and a pump shell; axially urging the pump shell against the backing plate to fix a desired installation depth based upon the height of the clutch pack; and fixedly securing the cover to the pump shell.

The present invention broadly comprises a torque converter including: a plurality of components axially disposed between a pump shell and a cover; and a pump hub fixedly secured to the pump shell. The position of the pump hub with respect to the pump shell is selected to establish respective axial distances between components in the plurality of components. In some aspects, the plurality of components further comprises an output hub and the position of the pump hub is selected to establish an axial distance between the cover and the pump hub. In some aspects, the plurality of components includes a bearing and the position of the pump hub is selected to establish an axial distance between the bearing and the pump hub.

The present invention also broadly comprises a method for assembling a torque converter, including the steps of: axially stacking a plurality of components in a cover; disposing a pump shell over the components and onto the cover; fixing the pump shell to the cover; positioning a pump hub against the pump shell at a specified axial distance from the cover to establish respective axial distances between components in the plurality of components; and fixedly securing the pump hub to the pump shell. In some aspects, the plurality of components includes an output hub and positioning a pump hub includes establishing an axial distance between the cover and the output hub. In some aspects, the plurality of components includes a bearing and positioning a pump hub includes establishing an axial distance between the bearing and the pump hub.

The present invention further broadly comprises a torque converter including: a plurality of components axially disposed between a pump shell and a cover; and a pump hub fixedly secured to the pump shell. The axial length of a flanged portion of the pump hub is selected to establish respective axial distances between components in the plurality of components. In some aspects, the plurality of components includes an output hub and the length of the pump hub is selected to establish an axial distance between the cover and the pump hub. In some aspects, the plurality of components includes a bearing and the length of the pump hub is selected to establish an axial distance between the bearing and the pump hub.

The present invention broadly comprises a method for assembling a torque converter, including the steps of: axially stacking a plurality of components in a cover; disposing a pump shell over the components and onto the cover; fixing the pump shell to the cover; determining an axial distance between a front of the cover and a back of the pump shell; selecting a pump hub having a length with a specified proportionality with respect to the axial distance, the specified proportionality resulting in predetermined respective axial distances between components in the plurality of components; and fixedly securing the pump hub to the pump shell. In some aspects, the plurality of components includes an output hub and selecting a pump hub includes establishing an axial distance between the cover and the output hub. In some aspects, the plurality of components includes a bearing and selecting a pump hub includes establishing an axial distance between the bearing and the pump hub.

The present invention also broadly comprises a torque converter including: a plurality of components axially disposed between a pump shell and a cover; and a pump hub fixedly secured to the pump shell at a position, with respect to the pump shell, chosen from a plurality of positions with respect to the pump shell, wherein the position is selected to establish respective axial distances between components in the plurality of components.

The present invention further broadly comprises a torque converter including: turbine shell; and a backing plate for a torque converter clutch, the backing plate rotationally connected to the turbine shell and forming a portion of a boundary between first and second pressure chambers. The pressure in an apply pressure chamber for the clutch is controlled independent of pressure in the first and second pressure chambers. In some aspects, the torque converter includes a turbine hub rotationally connected to a damper and the turbine shell. In some aspects, the damper includes a cover plate rotationally connected to the turbine hub. In some aspects, in lock up mode for the torque converter a first torque path is formed from the clutch to the damper and a second torque path is formed from the clutch to the damper through the turbine shell and the cover plate. In some aspects, the clutch includes a friction plate rotationally connected to the damper and the first torque path passes through the friction plate. In some aspects, the torque converter includes a pump shell and a rotational thrust transfer element disposed axially between the turbine shell and the pump shell. In some aspects, the backing plate is fixedly secured to the turbine shell. In some aspects, the torque converter includes a pump hub, a stator, and first and second wear washers axially disposed between the turbine hub and the stator and the stator and the pump hub, respectively.

The present invention broadly comprises a torque converter including: a cover; a torque converter clutch rotationally connected to the cover; and a piston plate for the clutch, the piston plate forming a portion of a boundary for an apply pressure chamber for the clutch. The pressure chamber is sealed with the exception of a fluid supply channel and the piston plate is arranged to displace toward a cover to close the clutch. In some aspects, the torque converter includes a torus and first and second pressure chambers, the first pressure chamber is in fluid communication with the second pressure chamber and the torus and pressure in the apply pressure chamber is controlled independent of pressure in the first and second pressure chambers. In some aspects, the torque converter includes cooling fluid, a torus, and first and second pressure chambers, the first pressure chamber is in fluid communication with the second pressure chamber and the torus, the clutch includes friction material and wherein when the clutch is closed, the cooling fluid is arranged to flow between the first and second pressure chambers through the friction material.

In some aspects, the torque converter includes a turbine shell forming a portion of a boundary for the apply pressure chamber. In some aspects, the piston plate is rotationally connected to the turbine shell. In some aspects, the torque converter includes a turbine hub and when the clutch is closed, the piston plate is arranged to transmit engine torque to the turbine hub via the turbine shell.

It is a general object of the present invention to provide a torque converter with a means of preventing rattle and reducing drag in a torque converter clutch during operation in torque converter mode, while also improving cooling flow.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
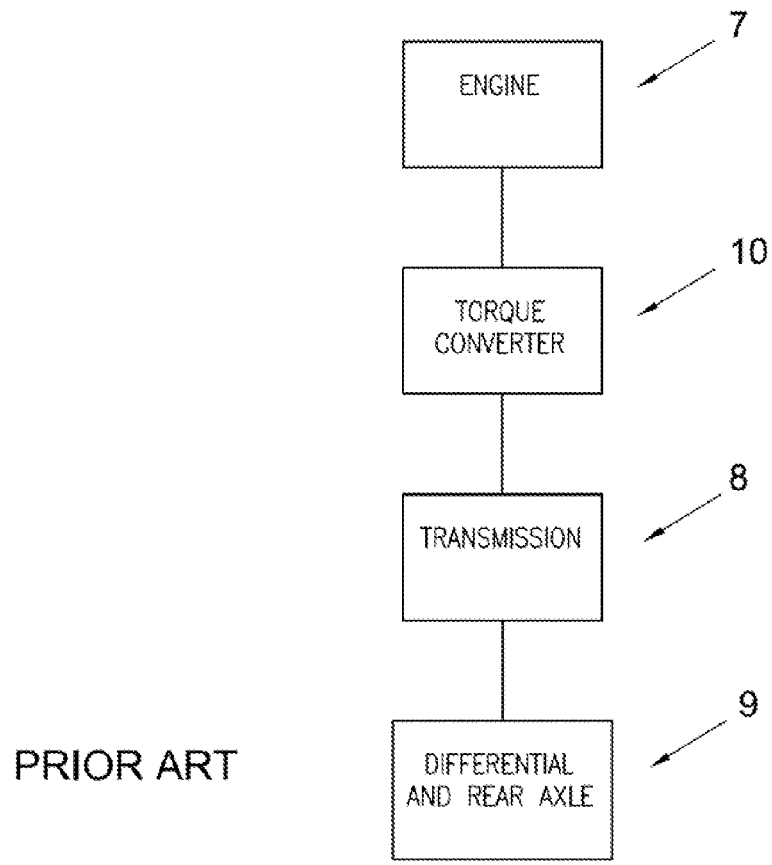
FIG. 1 is a general block diagram illustration of power flow in a motor vehicle, intended to help explain the relationship and function of a torque converter in the drive train thereof.
Figure 2:
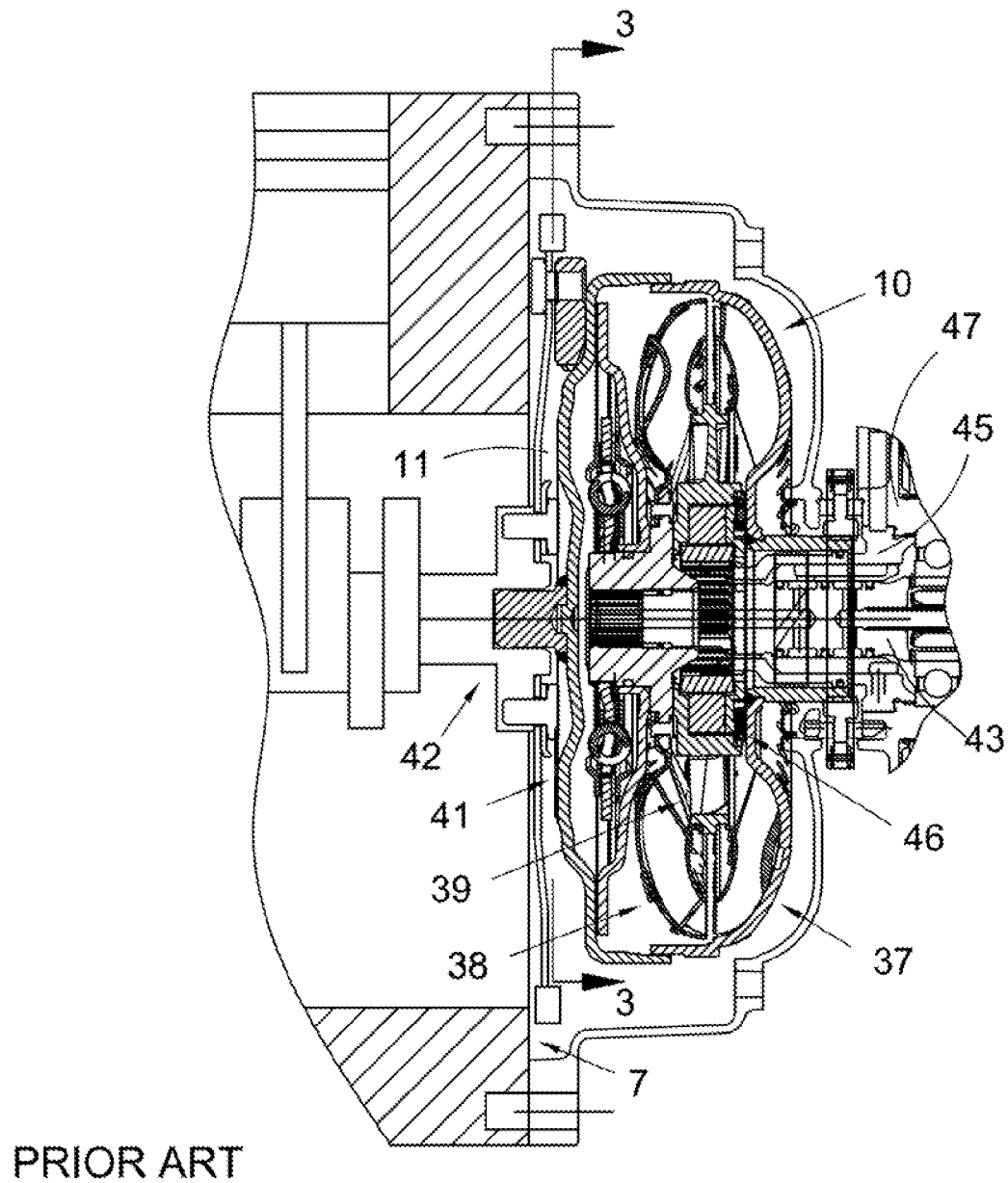
FIG. 2 is a cross-sectional view of a prior art torque converter, shown secured to an engine of a motor vehicle.
Figure 3:
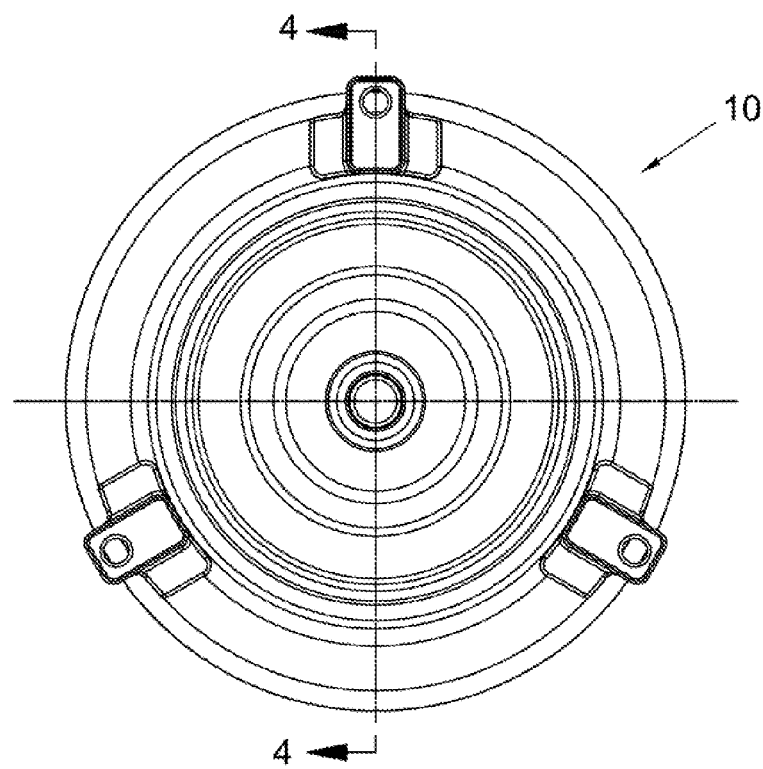
FIG. 3 is a left view of the torque converter shown in FIG. 2, taken generally along line 3-3 in FIG. 2.
Figure 4:
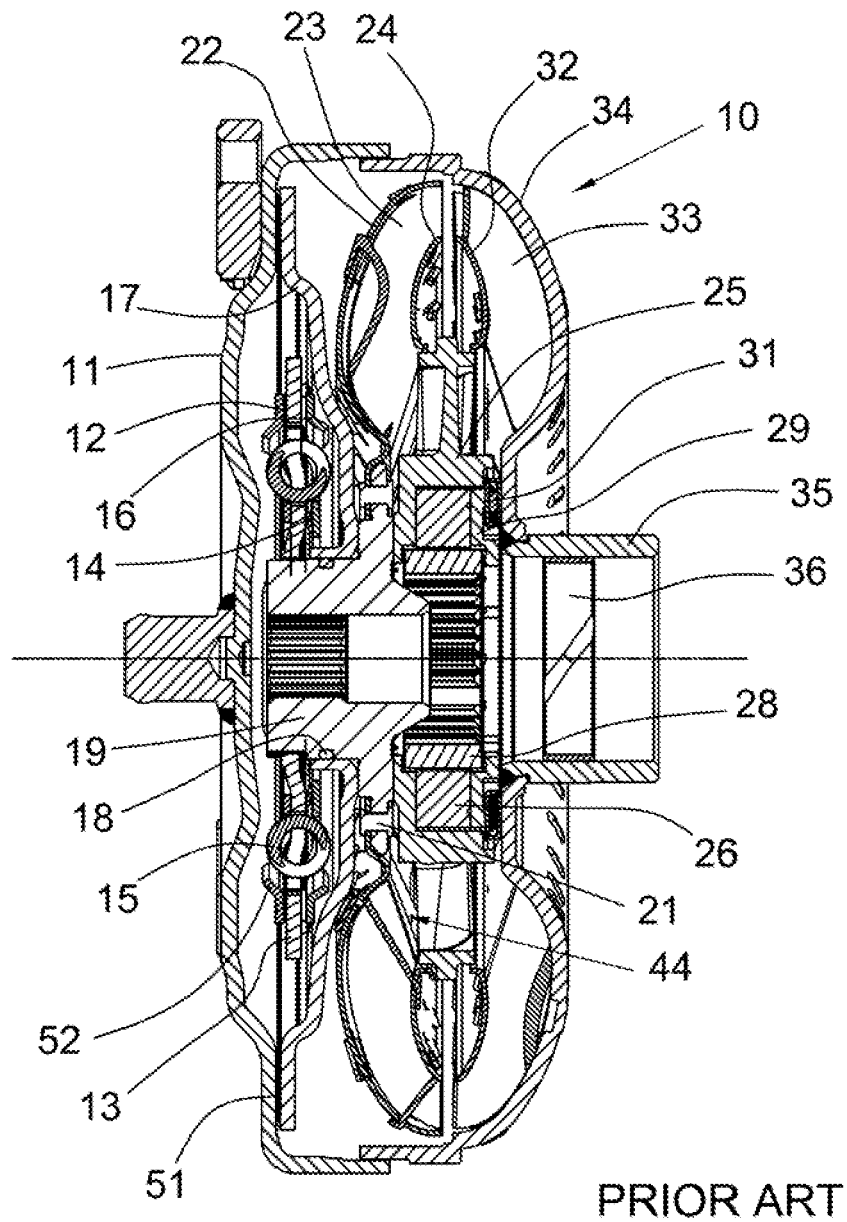
FIG. 4 is a cross-sectional view of the torque converter shown in FIGS. 2 and 3, taken generally along line 4-4 in FIG. 3.
Figure 5:
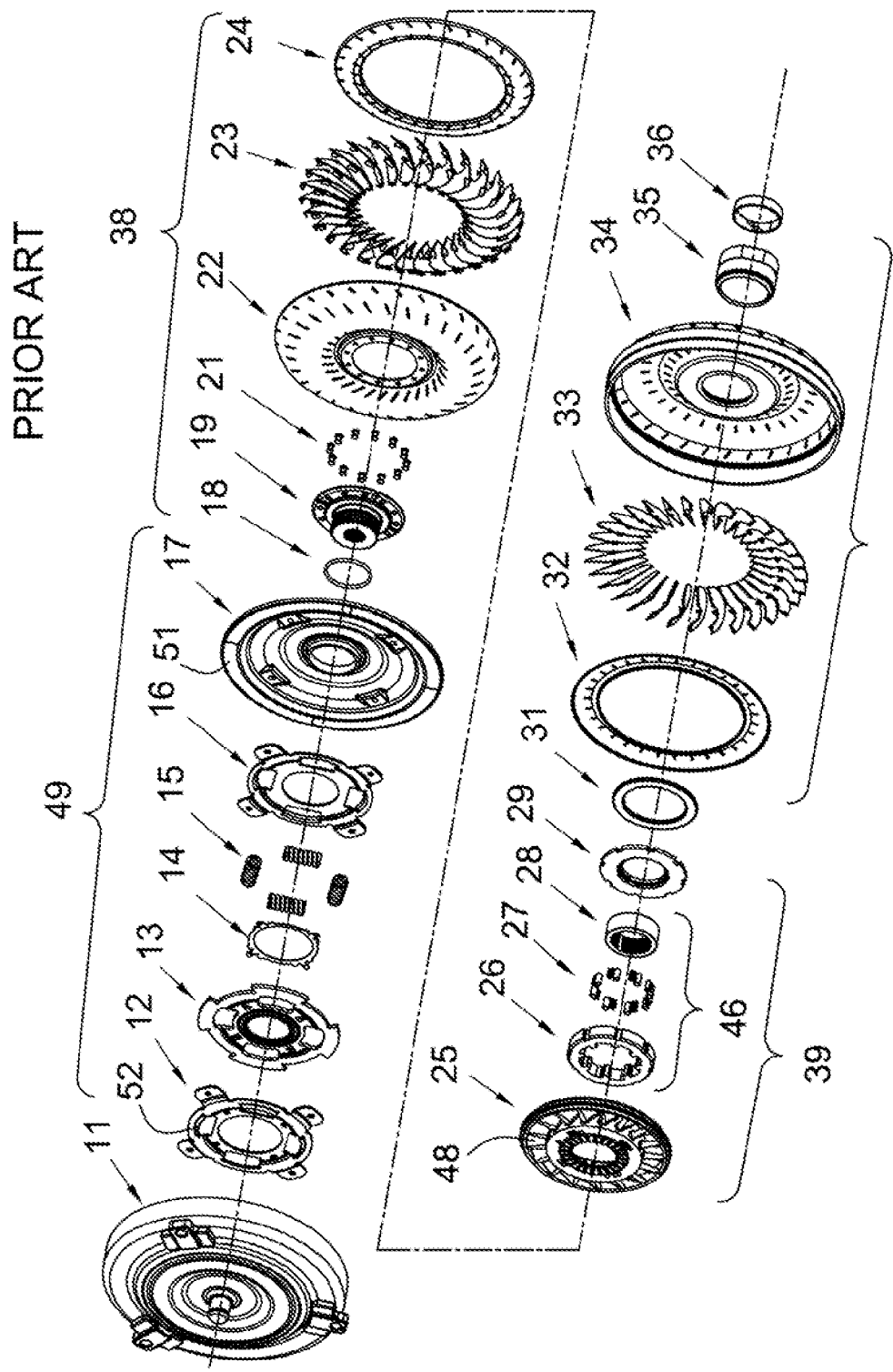
FIG. 5 is a first exploded view of the torque converter shown in FIG. 2, as shown from the perspective of one viewing the exploded torque converter from the left.
Figure 6:
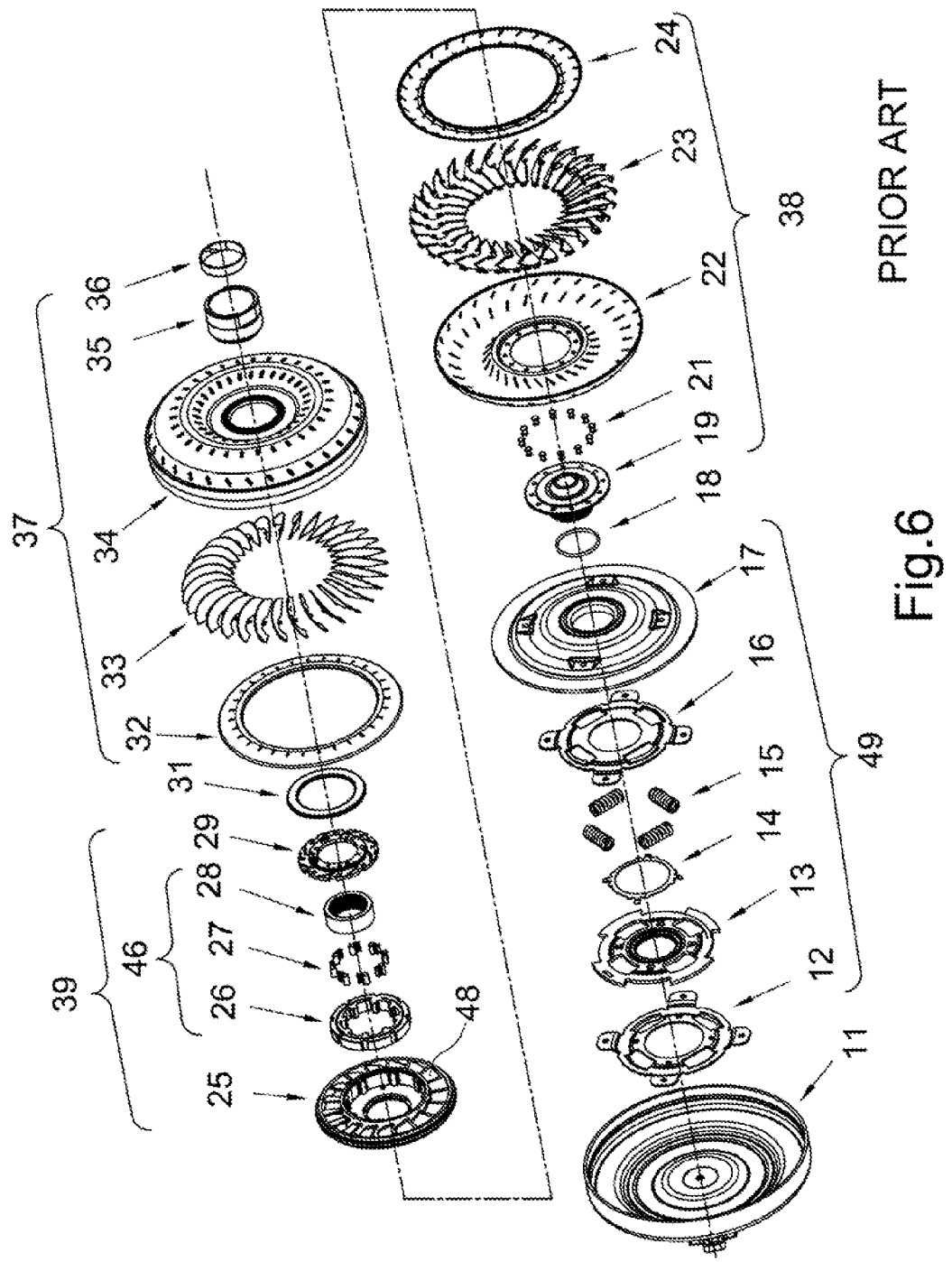
FIG. 6 is a second exploded view of the torque converter shown in FIG. 2, as shown from the perspective of one viewing the exploded torque converter from the right.
Figure 7A:
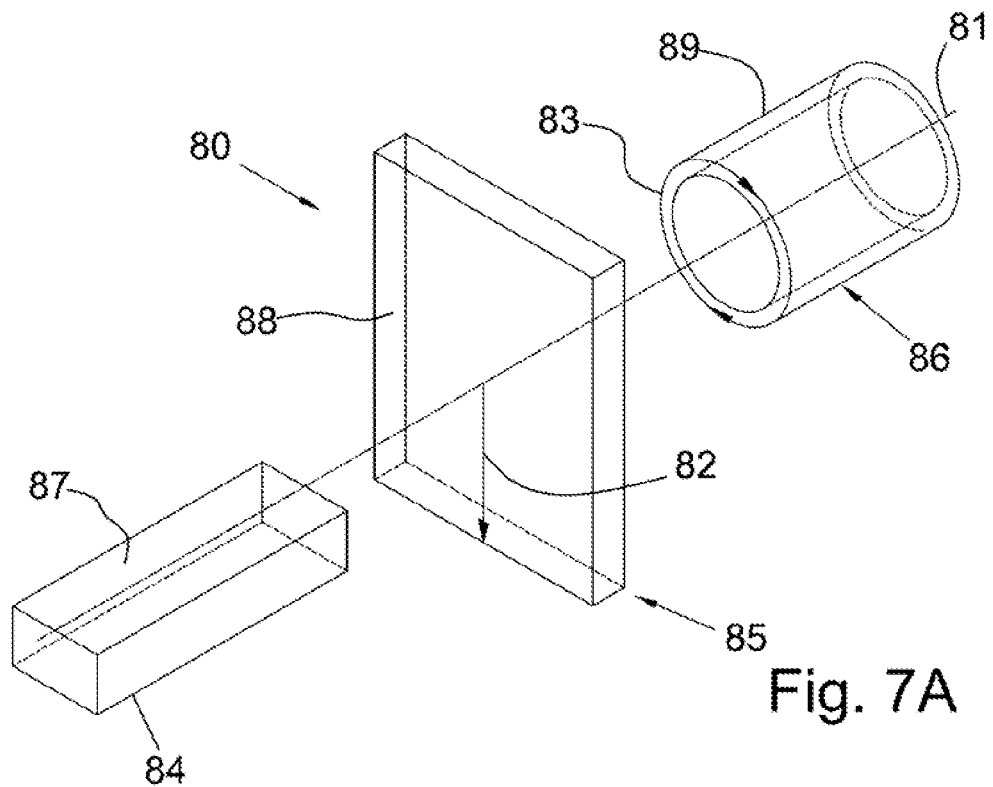
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 7B:
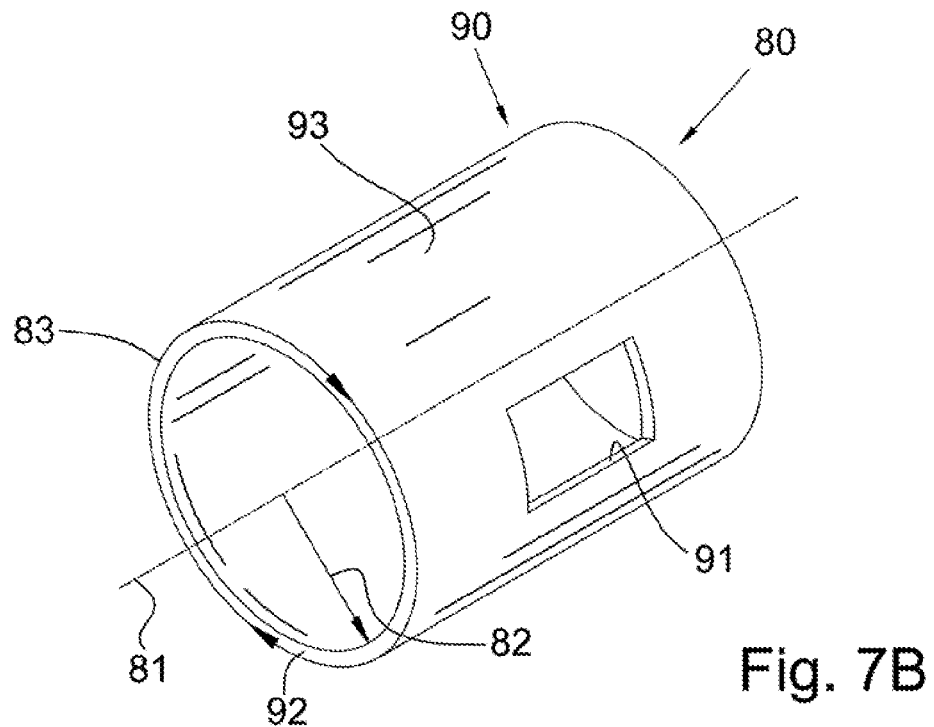
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
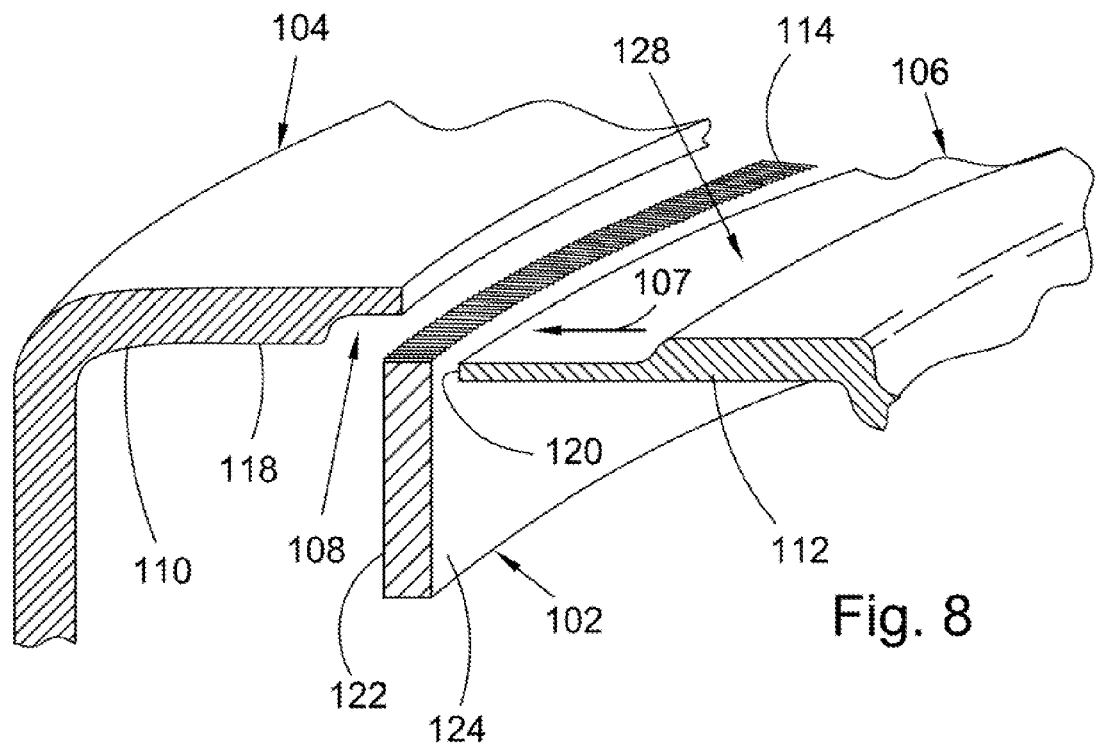
FIG. 8 is a partial exploded view of a present invention torque converter having a backing plate connected to the torque converter with an interference connection.

FIG. 8 is an partial exploded view of a present invention torque converter having a backing plate connected to the torque converter with an interference connection.

Figure 8A:
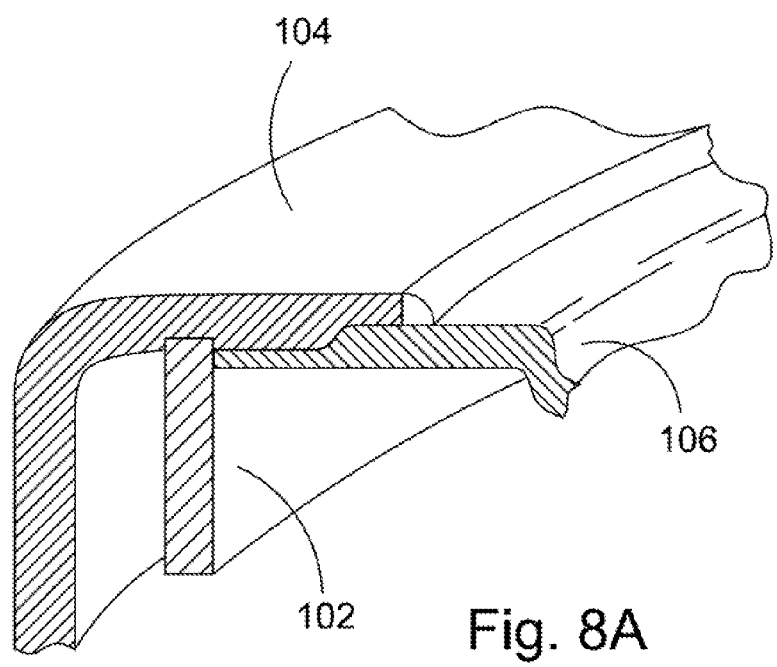
FIG. 8A is a partial perspective view of the torque converter shown in FIG. 8.

FIG. 8A is a partial perspective view of the torque converter shown in FIG. 8. The following should be viewed in light of FIGS. 8 and 8A. The torque converter, only partially shown, includes backing plate 102, cover 104 and pump shell 106. Backing plate 102 is fixed by contact with the cover and the pump shell, in particular, by axial pressure exerted by the cover and the pump shell against the plate. Cover 104 has stepped engagement feature 108 which is complimentary to pump shell 106 for sliding engagement. In some aspects, backing plate 102 is arranged for engagement with cover 104 upon axial movement of pump shell 106 in the direction of arrow 107.

The cover and shell include respective inner circumferential surfaces 110 and 112 and the backing plate includes outer circumferential surface 114 in contact with one of surfaces 110 or 112. In some aspects, surface 114 is irregular, for example, serrated, enabling a frictional, or interference, connection, for example, between cover 104 and backing plate 102, for example, in region 118. One of ordinary skill in the art should immediately recognize that cover 104 may also be deformable upon insertion of backing plate 102. For example, the backing plate 'digs into' the cover, or displaces material in the cover. The pump shell also includes radial surface 120 and the backing plate includes radial surface 124 in contact with surface 120, respectively.

Stepped engagement feature 108 is arranged for sliding engagement with complimentary stepped engagement feature 128 of pump shell 106. The interference connection between cover 104 and backing plate 102 permits the transfer of torque from cover 104 through backing plate 102 and into a clutch (not shown). For example, due to the interference fit of backing plate 102 with cover 104, backing plate 102 rotates with cover 104. Backing plate 102 is advantageously used as a friction plate in the clutch, whereby torque can be transmitted from backing plate 102 through friction faces to the clutch. The backing plate also reacts axial force created by the closing of the clutch. Finally, cover 104 and pump shell 106 may be connected, for example, by closure welding; meaning cover 104 and pump shell 106 are welded at the seam so as to prevent fluid leakage.

In assembling a torque converter, clutch lift-off, or axial space for free rotation of the clutch components, is required for proper drag free operation. Due to variances in materials and component specifications, proper lift-off must be obtained during final assembly of the torque converter. A first method of setting clutch lift-off is to install clutch plates (not shown) on cover side 122 of backing plate 102. Next, backing plate 102 is interference fit upon insertion of pump shell 106 until backing pate 102 is tight against the clutch. Pump shell 106 is pulled back and reinstalled at the proper depth to set clutch lift-off before closure welding the torque converter.

Another method of obtaining proper clutch lift-off is to measure the height of the clutch pack before assembly. Since the height of the clutch pack would then be known prior to assembly, backing plate 102 can be inserted only as deep as necessary in cover 104 to provide adequate lift-off.

Figure 9:
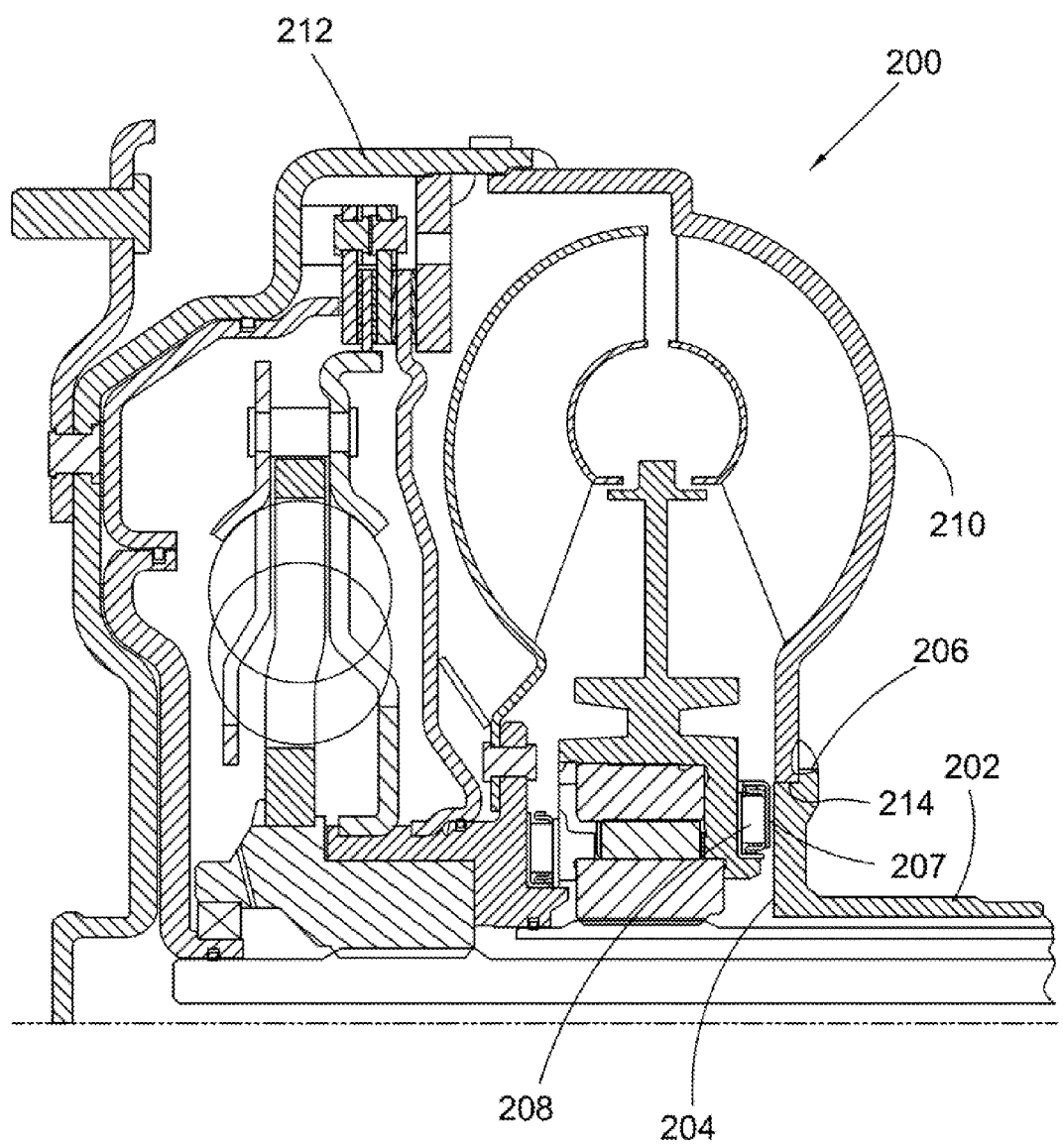
FIG. 9 is a partial cross-sectional view of a present invention torque converter with a pump hub having a variable installation depth.

FIG. 9 is a partial cross-sectional view of a present invention torque converter 200 with pump hub 202 having a variable installation depth. Pump hub 202 has bearing surface 204 and welding surface 206. As is well known in the art, for a torque converter that stacks through the converter as compared to stacking through the clutch, the position of bearing surface 204, for example, the axial location at which the surface engages surface 207 of bearing 208 establishes the spacing for axially stacked components in the torque converter, necessary for proper torque converter operation. That is, the position of hub 202, not the component stack establishes the required installation depth of pump shell 210 into cover 212. Alternately stated, the position of hub 202 establishes the respective axial relationships among the stacked components. Thus, it is critical to properly set the installation depth, that is, the position of surface 204, so that surface 207 does not 'float.' By 'float', we mean excessive free space between components leading to undesirable movement and possible malfunction of the components. On the other hand, insufficient axial space can jam components, again, compromising performance. The component stack of the torque converter comprises at least the arrangement of a piston plate, a damper assembly, a clutch, a turbine, a turbine hub, a stator, and the bearings, such as bearing 208, axially disposed between cover 212 and pump shell 210.

For a torque converter stacked through the converter, if the clutch lift-off is used to control axial spacing, surface 207 would float. Therefore, in some aspects, the components are stacked in cover 212, pump shell 210 is engaged with the cover and the cover and shell are welded together. Hub 202 is installed. The axial position of the hub is controlled by sliding the hub in and out of the pump to provide the proper axial relationship between surfaces 204 and 207. Once hub 202 is positioned, the hub is welded to the pump shell. Alternately stated, a plurality of components is axially disposed between the pump shell and the cover, and the pump hub is fixedly secured to the pump shell, with the position of the pump hub with respect to the pump shell is selected, prior to fixing the hub to the shell, to establish respective axial distances between components in the plurality of components. That is, the position of the pump hub is selected to establish an axial distance between the cover and the pump hub.

In some aspects, a plurality of pump hubs 202 having different respective axial lengths for a flanged area of the hub, for example, segment 214, are used to establish the desired axial relationship between surfaces 204 and 207. For example, once the components are stacked in cover 212, pump shell 210 is engaged with the cover and the cover and shell are welded together, a hub 202 with a segment 214 having the required axial length is selected, inserted to engage pump shell surface 214 and then welded to the pump shell.

Figure 10:
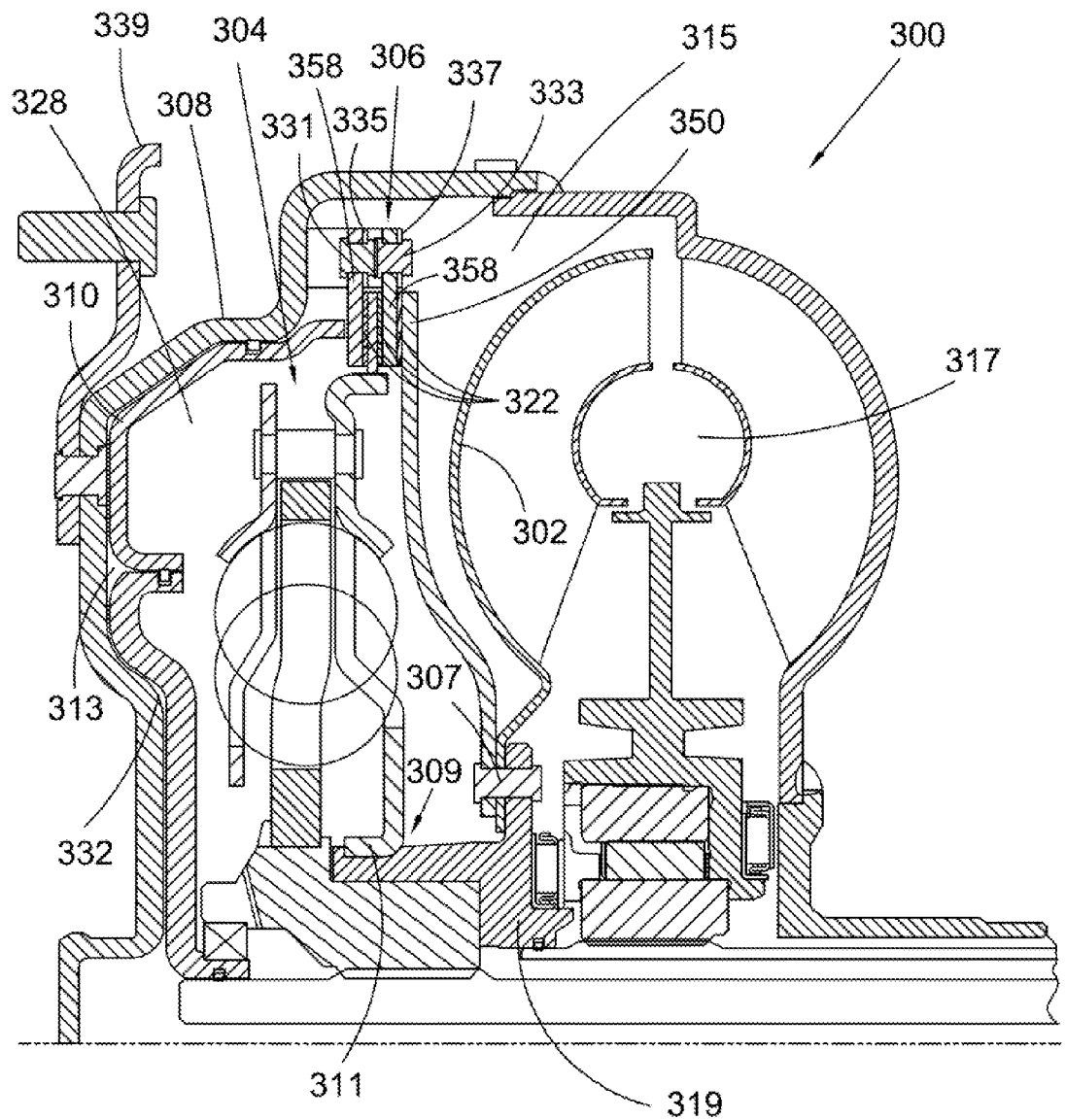
FIG. 10 is a partial cross-sectional view of a present invention torque converter with a backing plate rotationally connecting a torque converter clutch and a turbine shell.

FIG. 10 is a partial cross-sectional view present invention torque converter 300 with backing plate 350 rotationally connecting torque converter clutch 306 and turbine shell 302. Plate 350 also acts a sealing plate forming at least a portion of a boundary between pressure chambers 328 and 315. As further described infra, pressure in apply pressure chamber 313 for the clutch is controlled independent of pressure in chambers 328 and 315. In some aspects, sealing plate 350 is fixedly secured to turbine shell 302 at turbine hub 319 using any means known in the art, for example, rivet 307. By rotationally connected, or secured, we mean that the backing plate and the clutch are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra.

The clutch also includes friction material 322. Any type of friction material known in the art can be used. The friction material can be configured in any manner known in the art. For example, the friction material can be fastened to another component, such as plates 358, or can be separate elements that are disposed between other components, such as friction plates 358. Sealing plate 350 reacts the pressure applied by piston plate 310 to close the clutch. To attain the rigidity necessary to react the pressure from piston plate 310, in some aspects, the backing plate is formed in an irregular configuration, for example, ribbed.

During lock-up mode for the torque converter, for example, when clutch 306 is closed, clutch 306 is arranged to transmit torque to the turbine hub, through plate 350 and rivet 307, advantageously enabling the transmission of torque from clutch 306 to turbine hub 319. The torque 'preloads' the turbine hub, eliminating the vibration and noise problem noted supra. That is, plate 350 transmits engine torque to the turbine hub, which otherwise is carrying little or no torque, locking spline connection 309 between cover plate 311 of damper 304 and hub 319. That is, contact between the plate and the hub is maintained in the spline connection. The connection of a torque converter clutch to a turbine hub is further described in commonly-owned U.S. Provisional Patent Application No. 60/816,932, filed Jun. 28, 2006, which is incorporated by reference herein.

Chamber 315 which is in fluid communication with torus 317 and chamber 328. When the clutch is open, cooling fluid (not shown) flows from chamber 328, between the friction material to chamber 315 and the torus, providing a cooling flow for the torus. When the clutch is closed, the cooling fluid is arranged to flow from pressure chamber 328 through the friction material, for example, through grooves in the friction material, to chamber 315 and the torus. In some aspects, the cooling flow is reversed, that is, the cooling fluid flows from the torus to chamber 315 to chamber 328. Thus, torque converter 300 provides an advantageous cooling flow through the friction material, enhancing the performance and durability of the friction material, while continuing to supply cooling flow to the torus.

The operation of chamber 313 is independent of the operation of chambers 315 and 328. Specifically, the charging and venting of chamber 313, and hence the operation of clutch 306 is performed independent of the pressure and cooling fluid flow through chambers 315 and 328 and the torus. For example, chamber 313 is charged without interrupting the pressure in chambers 315 and 328, since chamber 313 is independently supplied with cooling fluid through channel 332. Therefore, chamber 328 continues to provide cooling fluid through the clutch friction material to chamber 315 and the torus during lock-up mode.

Friction plates 358 are connected to cover 308 by any means known in the art. In some aspects, fasteners 331 and 333 are used to connect the plates to springs 335 and 337, respectively. Any fastener known in the art can be used, including, but not limited to rivets. The springs are fixed to cover 308 and transmit engine torque from the cover to the respective friction plates. The cover is connected to an engine or flexplate (not shown), by any means known in the art, for example, drive plate 339. In some aspects (not shown), a spline arrangement is used to connect plates 358 to the cover. Advantageously, the use of a spring connection instead of a spline connection reduces undesirable vibration that is inherent in the use of the spline connection.

Figure 11:
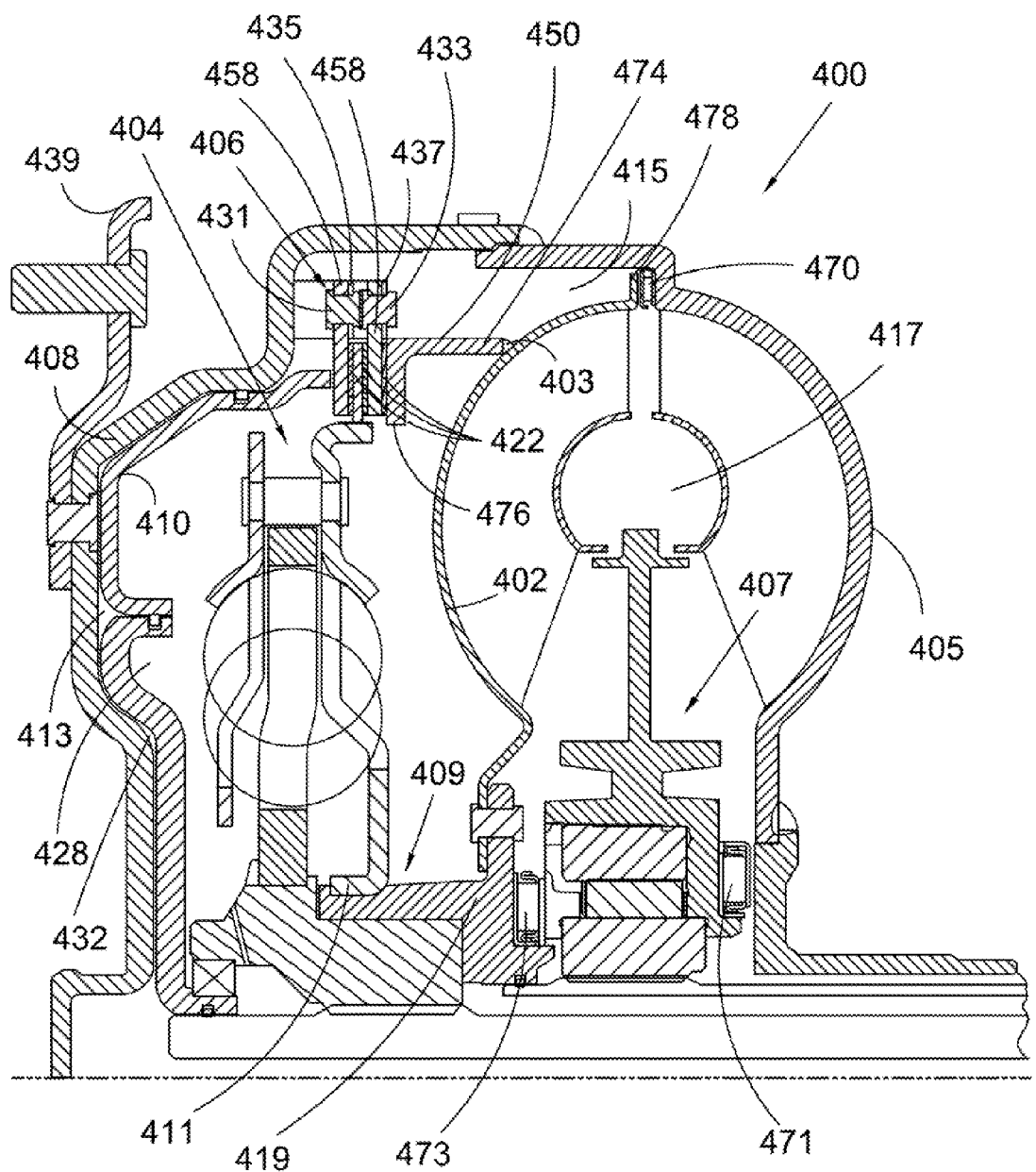
FIG. 11 is a partial cross-sectional view of a present invention torque converter with a torque converter clutch rotationally connected to a turbine shell.

FIG. 11 is a partial cross-sectional view of present invention torque converter 400 with backing plate 450 rotationally connecting torque converter clutch 406 and turbine shell 402. Plate 450 also acts as a sealing plate forming at least a portion of a boundary between pressure chambers 428 and 415. As further described infra, pressure in apply pressure chamber 413 for the clutch is controlled independent of pressure in chambers 428 and 415. In some aspects, sealing plate 450 is fixedly secured to turbine shell 402 using any means known in the art, for example, weld 403.

The clutch also includes friction material 422. Any type of friction material known in the art can be used. The friction material can be configured in any manner known in the art. For example, the friction material can be fastened to another component, such as plate 450, or can be separate elements that are disposed between other components, such as friction plates 458. Sealing plate 450 reacts the pressure applied by piston plate 410 to close the clutch. In some aspects, the reaction function of the backing plate may create an axial deflection in turbine shell 402. Therefore, in some aspects, rotational thrust transfer element 470, which can be any such element known in the art, for example, bearing 470, is disposed axially between the turbine shell and pump shell 405 to transfer the thrust from the clutch to the pump shell. In some aspects (not shown), bearings 471 and 473, disposed respectively between pump shell 405 and stator 407 and between stator 407 and hub 419 are replaced by respective wear washers.

During lock-up mode for the torque converter, for example, when clutch 406 is closed, clutch 406 is arranged to transmit torque to the turbine hub, through plate 450 and weld 403, advantageously enabling the transmission of torque from clutch 406 to turbine hub 419. The torque 'preloads' the turbine hub, eliminating the vibration and noise problem noted supra. That is, plate 450 transmits engine torque to the turbine hub, which otherwise is carrying little or no torque, locking spline connection 409 between cover plate 411 of damper 404 and hub 419. That is, contact between the plate and the hub is maintained in the spline connection. The connection of a torque converter clutch to a turbine hub is further described in commonly-owned U.S. Provisional Patent Application No. 60/816,932, filed Jun. 28, 2006, which is incorporated by reference herein.

Chamber 415 which is in fluid communication with torus 417 and chamber 428. When the clutch is open, cooling fluid (not shown) flows from chamber 428, between the friction material to chamber 415 and the torus, providing a cooling flow for the torus. When the clutch is closed, the cooling fluid is arranged to flow from pressure chamber 428 through the friction material, for example, through grooves in the friction material, to chamber 415 and the torus. In some aspects, the cooling flow is reversed, that is, the cooling fluid flows from the torus to chamber 415 to chamber 428. Thus, torque converter 400 provides an advantageous cooling flow through the friction material, enhancing the performance and durability of the friction material, while continuing to supply cooling flow to the torus.

The operation of chamber 413 is independent of the operation of chambers 415 and 428. Specifically, the charging and venting of chamber 413, and hence the operation of clutch 406 is performed independent of the pressure and cooling fluid flow through chambers 415 and 428 and the torus. For example, chamber 413 is charged without interrupting the pressure in chambers 415 and 428, since chamber 413 is independently supplied with cooling fluid through channel 432. Therefore, chamber 428 continues to provide cooling fluid through the clutch friction material to chamber 415 and the torus during lock-up mode.

Friction plates 458 are connected to cover 408 by any means known in the art. In some aspects, fasteners 431 and 433 are used to connect the plates to springs 435 and 437, respectively. Any fastener known in the art can be used, including, but not limited to rivets. The springs are fixed to cover 413 and transmit engine torque from the cover to the respective friction plates. The cover is connected to an engine or flexplate (not shown), by any means known in the art, for example, drive plate 439. In some aspects (not shown), a spline arrangement is used to connect plates 458 to the cover. Advantageously, the use of a spring connection instead of a spline connection reduces undesirable vibration that is inherent in the use of the spline connection.

Figure 12:
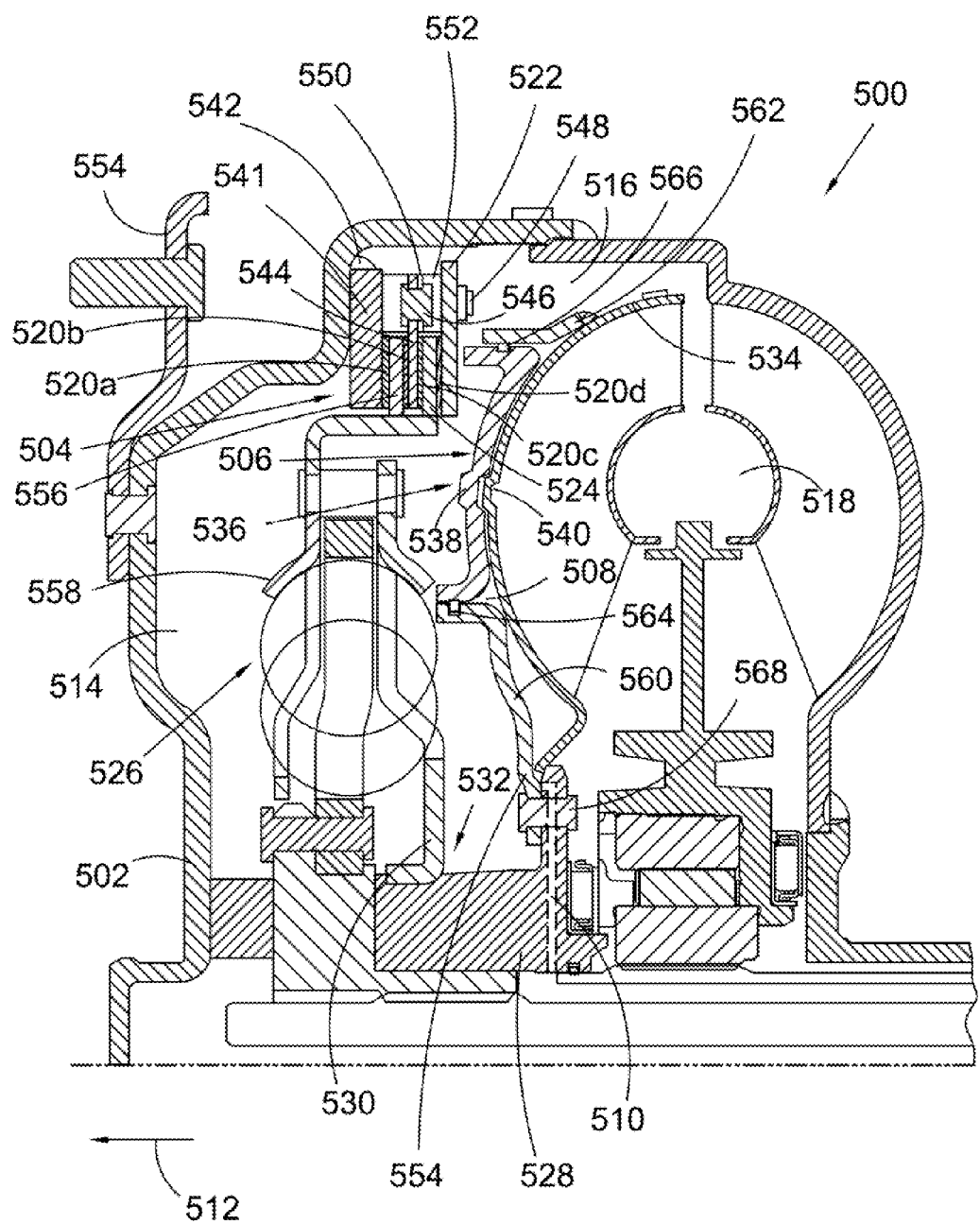
FIG. 12 is a partial cross-sectional view of a present invention torque converter with a piston plate rotationally connected to a turbine shell.

FIG. 12 is a partial cross-sectional view of present invention torque converter 500. Torque converter 500 includes cover 502, torque converter clutch 504, rotationally connected to the cover, and piston plate 506 for the clutch. The piston plate forms a portion of apply pressure chamber 508 for the clutch. That is, the piston plate forms a portion of the boundary of chamber 508. The pressure chamber is sealed with the exception of fluid supply channel 510, used to charge and vent the chamber. The piston plate is arranged to displace toward cover 502, that is, in direction 512, during lock-up mode for the torque converter, that is, when clutch 504 is closed.

Torque converter 500 also includes pressure chambers 514 and 516 and torus 518. Chamber 516 is in fluid communication with chamber 514 and the torus. The clutch includes friction material 520a, 520b, 520c, and 520d. Any type of friction material known in the art can be used. The friction material can be configured in any manner known in the art. For example, the friction material can be fastened to another component, such as drive plate 522, or can be separate elements that are disposed between other components, such as drive plate 522 and friction plate 524. When the clutch is open, cooling fluid (not shown) flows from chamber 514, between the friction material to chamber 516 and the torus, providing a cooling flow for the torus. When the clutch is closed, the cooling fluid is arranged to flow from pressure chamber 514 through the friction material, for example, through grooves in the friction material, to the pressure chamber 516 and the torus. In some aspects, the cooling flow is reversed, that is, the cooling fluid flows from the torus to chamber 516 to chamber 514. Thus, torque converter 500 provides an advantageous cooling flow through the friction material, enhancing the performance and durability of the friction material, while continuing to supply cooling flow to the torus.

The operation of chamber 508 is independent of the operation of chambers 514 and 516. Specifically, the charging and venting of chamber 508, and hence the operation of clutch 504 is performed independent of the pressure and cooling fluid flow through chambers 514 and 516 and the torus. For example, chamber 508 is charged without interrupting the pressure is chambers 514 and 516, since chamber 508 is independently supplied with cooling fluid through channel 510. Therefore, chamber 514 continues to provide cooling fluid through the clutch friction material to chamber 516 and the torus during lock-up mode.

Torque converter 500 includes damper assembly 526, rotationally connected to turbine hub 528 through cover plate 530 and spline connection 532. The connection of a torque converter clutch to a turbine hub is described in commonly-owned U.S. Provisional Patent Application No. 60/816,932, filed Jun. 28, 2006, which is incorporated by reference herein. The torque converter also includes turbine shell 534. Turbine shell 534 forms a portion of the boundary for chamber 508. In some aspects, the torque converter includes anti-rotational arrangement 536, which rotationally connects the shell to piston plate 506. The rotational arrangement can be by any means known in the art, for example, by indents 538 in the piston plate interlocked with protrusions 540 in the shell. The piston plate is frictionally engaged with plate 522 in lock-up mode. Thus, during lock-up mode for the torque converter, clutch 504 is arranged to transmit torque to the turbine hub through the piston plate and arrangement 536, advantageously enabling the transmission of engine torque from clutch 504 to turbine hub 528 during operation in lock-up mode for converter 500. The transmitted engine torque 'pre-loads' the turbine hub, eliminating the vibration and noise problem noted supra. That is, plate 506 transmits engine torque to the turbine hub, which otherwise is carrying little or no torque, locking the spline connection between plate 530 and hub 528. That is, contact between the plate and the hub is maintained in the spline connection.

In some aspects, plate 541 is fixed to cover 502 by any means known in the art, for example, weld 542. In some aspects plates 544 and 522 are connected to plate 541 and cover 502 by any means known in the art. In some aspects, fasteners 546 and 548 are used to connect the plates to springs 550 and 552, respectively. Any fastener known in the art can be used, including, but not limited to rivets. The fasteners and springs transmit engine torque from the cover to the respective friction plates and backing plate. The cover is connected to an engine or flexplate (not shown), by any means known in the art, for example, drive plate 554. In some aspects (not shown), a spline arrangement is used to connect plates 522, 524, and 544 to the cover. Advantageously, the use of a spring connection instead of a spline connection reduces undesirable vibration that is inherent in the use of the spline connection.

Plates 554 and 506 and seals 564 and 566 also bound chamber 508. Plate 554 is fixed to the turbine shell and/or the turbine hub by any means known in the art, for example, rivet 568. Plate 562 is fixed to the turbine shell by any means known in the art. Seals 564 and 566 enable displacement of plate 506 to operate clutch 504.

Figure 13:
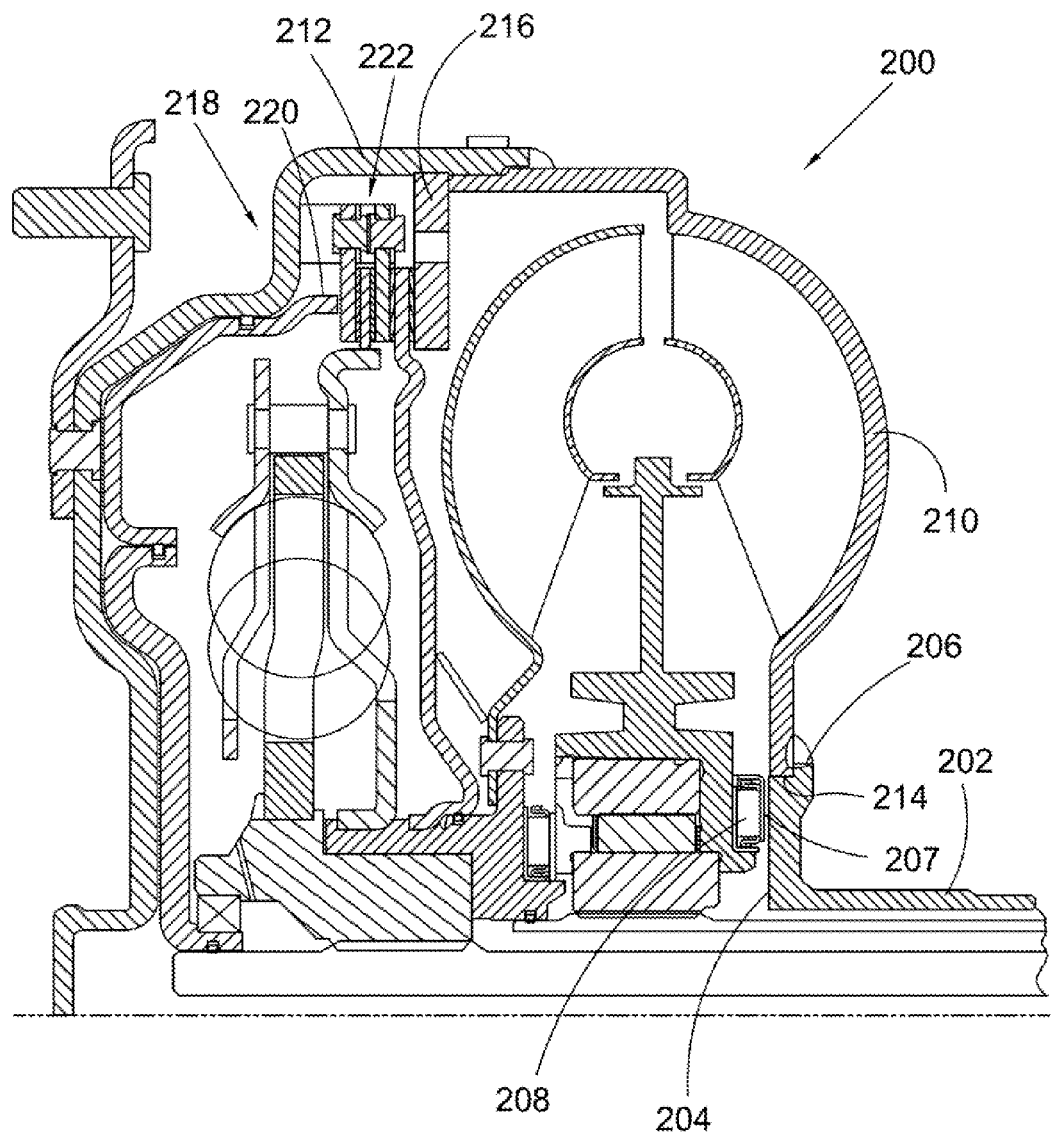
FIG. 13 is a partial cross-sectional view of the present invention torque converter with a pump hub having a variable installation depth shown in FIG. 9 with a backing plate connected to the torque converter with an interference connection as shown in FIGS. 8 and 8A.

FIG. 13 is a partial cross-sectional view of the present invention torque converter with a pump hub having a variable installation depth shown in FIG. 9 with a backing plate connected to the torque converter with an interference connection as shown in FIGS. 8 and 8A. Torque convert 200 includes backing plate 216 which is part of torque converter clutch 218. Clutch 218 includes piston plate 220 and clutch plates 222. The discussion of FIGS. 8 and 8A regarding cover 104, backing plate 102, and pump shell 106 is applicable to cover 212, backing plate 216, and pump shell 210, respectively, in FIG. 13. The discussion of FIG. 9 is applicable to FIG. 13. As described for FIGS. 8 and 8A, the radial surface of pump shell 210 in FIG. 13 is in contact with a radial surface of backing plate 216. As further described for FIGS. 8 and 8A, axial movement of pump 210 shell against the backing plate engages the backing plate with the cover. The discussion for FIGS. 8 and 8A regarding clutch lift-off, backing plate 102, and a position of pump shell 106 is applicable to clutch 218, backing plate 216, and pump shell 210 of FIG. 13.

It should be understood that a present invention torque converter is not limited to the type, size, number, or configuration of components shown in the figures and that other types, sizes, numbers, or configurations of components are included in the spirit and scope of the claimed invention. For example, other types of components and numbers, sizes, and configurations of components are included in the spirit and scope of the claimed invention.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A torque converter comprising:
a turbine shell; and,
a backing plate for a torque converter clutch, the backing plate rotationally connected to the turbine shell so that rotation of the backing plate is fixed with respect to rotation of the turbine, and forming a portion of a boundary between first and second pressure chambers, wherein pressure in an apply pressure chamber for the clutch is controlled independent of pressure in the first and second pressure chambers.

2. The torque converter of claim 1 further comprising a turbine hub rotationally connected to a damper and the turbine shell.

3. The torque converter of claim 2 wherein the damper includes a cover plate rotationally connected to the turbine hub.

4. The torque converter of claim 3 wherein in lock up mode for the torque converter a first torque path is formed from the clutch to the damper and a second torque path is formed from the clutch to the damper through the turbine shell and the cover plate.

5. The torque converter of claim 4 wherein the clutch includes a friction plate rotationally connected to the damper and the first torque path passes through the friction plate.

6. The torque converter of claim 2 further comprising a pump hub, a stator, and first and second wear washers axially disposed between the turbine hub and the stator and the stator and the pump hub, respectively.

7. The torque converter of claim 1 further comprising a pump shell and a rotational thrust transfer element disposed axially between the turbine shell and the pump shell.

8. The torque converter of claim 1 wherein the backing plate is fixedly secured to the turbine shell.

9. A torque converter comprising:
a cover;
a turbine shell;
a torque converter clutch rotationally connected to the cover; and,
a piston plate for the clutch, wherein the piston plate and the turbine shell form a portion of a boundary for an apply pressure chamber for the clutch, wherein the pressure chamber is sealed with the exception of a fluid supply channel and wherein the piston plate is arranged to displace toward a cover to close the clutch.

10. The torque converter of claim 9 including a torus and first and second pressure chambers, wherein the first pressure chamber is in fluid communication with the second pressure chamber and the torus and wherein pressure in the apply pressure chamber is controlled independent of pressure in the first and second pressure chambers.

11. The torque converter of claim 9 including cooling fluid, a torus, and first and second pressure chambers, wherein the first pressure chamber is in fluid communication with the second pressure chamber and the torus, wherein the clutch includes friction material and wherein when the clutch is closed, the cooling fluid is arranged to flow between the first and second pressure chambers through the friction material.

12. The torque converter of claim 9 wherein the piston plate is rotationally connected to the turbine shell.

13. The torque converter of claim 9 including a turbine hub and wherein, when the clutch is closed, the piston plate is arranged to transmit engine torque to the turbine hub via the turbine shell.

* * * * *